United States Patent [19]
Hitomi

[11] Patent Number: 5,947,397
[45] Date of Patent: Sep. 7, 1999

[54] COMPACT SPINNING REEL HAVING INCLINED PIVOTING AXIS

[75] Inventor: Yasuhiro Hitomi, Hashimoto, Japan

[73] Assignee: Shimano, Inc., Japan

[21] Appl. No.: 08/904,076

[22] Filed: Jul. 31, 1997

Related U.S. Application Data

[63] Continuation of application No. 08/492,925, Jun. 21, 1995, abandoned.

[30] Foreign Application Priority Data

Jun. 27, 1994 [JP] Japan ................................... 6-144644

[51] Int. Cl.$^6$ .................................................. A01K 89/01
[52] U.S. Cl. ............................................................ 242/231
[58] Field of Search .................... 242/230, 231, 242/232, 233, 241

[56] References Cited

U.S. PATENT DOCUMENTS

| | | | |
|---|---|---|---|
| 3,743,207 | 7/1973 | McMickle | 242/233 |
| 3,987,976 | 10/1976 | Lilland | 242/232 |
| 4,171,108 | 10/1979 | Ishida et al. | 242/231 |
| 5,246,186 | 9/1993 | Sugawara | 242/232 |

FOREIGN PATENT DOCUMENTS

| | | | |
|---|---|---|---|
| 0 456 262 | 11/1991 | European Pat. Off. | |
| 000585947 | 3/1994 | European Pat. Off. | 242/230 |
| 585947 | 3/1994 | European Pat. Off. | 242/230 |
| 1176814 | 4/1959 | France | |
| 1213235 | 3/1960 | France | |
| 42 26 059 | 2/1993 | Germany | |
| 1171879 | 11/1969 | United Kingdom | |
| 002260678 | 4/1993 | United Kingdom | 242/231 |
| 2260278 | 4/1993 | United Kingdom | 242/231 |

OTHER PUBLICATIONS

European Search Report, app. No. 95304470.8, issued Oct. 9, 1995.

Primary Examiner—Donald P. Walsh
Assistant Examiner—Emmanuel M. Marcelo
Attorney, Agent, or Firm—Jeffer, Mangles, Butler & Marmaro LLP

[57] ABSTRACT

A spinning reel capable of being mounted on a fishing rod includes a reel main body which has a handle and which is capable of being mounted on a fishing rod, a rotor which has an axis of rotation, which is supported on the front part of the reel main body so that the rotor is free to rotate, and which can be caused to rotate by means of the handle, and a spool which is installed on the front part of the rotor, and which has an outer circumference adapted to receive a fishing line. The rotor includes (i) a first arm and a second arm which are installed facing each other on opposite sides of the axis of rotation of the rotor and have inner- and outer-circumferential sides, (ii) a first bail supporting member which is mounted on the inner-circumferential side of the first arm such that the first bail supporting member is free to pivot, and which has a first center of pivoting motion and a line guiding part, (iii) a second bail supporting member which is mounted on the second arm such that the second bail supporting member is free to pivot, and which has a second center of pivoting motion which is located forward of the first center of pivoting motion of the first bail supporting member, and (iv) a bail which extends between the first bail supporting member and the second bail supporting member, and which is capable of adopting both a line retrieving position and a line releasing position.

16 Claims, 7 Drawing Sheets

COMPACT SPINNING REEL HAVING INCLINED PIVOTING AXIS

This application is a continuation of application Ser. No. 08/492,925, filed Jun. 21, 1995, now abandoned.

FIELD OF THE INVENTION

The present invention relates to a spinning reel, and specifically concerns a spinning reel equipped with bail supporting members which are used to place the bail in a line retrieving position or a line releasing position.

BACKGROUND OF THE INVENTION

Spinning reels generally have a reel main body, a rotor which is supported on the reel main body so that the rotor is free to rotate, and a spool around which a fishing line is wound. The rotor has a first arm and second arm which are installed facing each other on opposite sides of a rotating shaft, bail supporting members which are mounted on the tips of the respective arms so that the bail supporting members are free to pivot, and a bail which is installed between the bail supporting members. This bail adopts either a line releasing position or a line retrieving position by pivoting together with the bail supporting members. Furthermore, a line roller which guides the fishing line is installed on the tip of one of the bail supporting members.

In such a spinning reel, the bail is pushed over into the line releasing position during casting. Then, when the fishing line is to be taken up after casting, the bail is returned to the line retrieving position. When the handle is turned with the bail in the line retrieving position, the fishing line is taken up around the outer circumference of the spool while being guided by a line roller positioned on the attachment end of the bail.

In spinning reels of the type described above, the bail supporting members are mounted on the outer-circumferential sides of the respective arms. In the case of such a construction, a large space is required between the rotor and the fishing rod in order to prevent the bail supporting members mounted on the arms from contacting the hand holding the fishing rod during the rotation of the rotor. However, in cases where the rotor is thus installed at a distance from the fishing rod, the distance between the handle position and the fishing rod is increased, so that the moment acting on the fishing rod when the handle is operated is also increased. Furthermore, if the radius of rotation of the bail supporting member on the side where the line roller is mounted is large, it becomes difficult to achieve the proper balance during rotation. In addition, when the bail supporting members are pushed over into the line releasing position during casting, the resulting state is such that the fishing line tends to become entangled with the bail supporting members.

Accordingly, there are reel constructions in which the first bail supporting member on which the line roller is installed is mounted on the inner circumferential side of the corresponding arm as indicated in Japanese Utility Model Application Kokai No. 4-12864, etc. However, even in the case of such reel constructions, the line roller projects to the outside when the bail is pushed over into the line releasing position, so that entanglement of the line cannot be sufficiently avoided.

One object of the present invention is to reduce the incidence of line entanglement during casting, and also to prevent an imbalance during rotation, in a spinning reel in which a line guiding part is installed on the tip of one of the bail supporting members.

Another object of the present invention is to make it possible to reduce the incidence of line entanglement, and to reduce the overall size of the reel.

SUMMARY OF THE PREFERRED EMBODIMENTS

In accordance with one aspect of the present invention, there is provided an improved spinning reel. The spinning reel is equipped with a reel main body, a rotor and a spool. The reel main body has a handle, and can be mounted on the fishing rod. The rotor is supported on the front part of the reel main body so that the rotor is free to rotate. The rotor is caused to rotate by means of the handle. The spool is installed on the front part of the rotor, and has a fishing line wound around its outer circumference.

More particularly, the rotor has (i) a first arm and a second arm which are installed facing each other on opposite sides of the axis of rotation of the rotor, (ii) a first bail supporting member which is mounted on the inner-circumferential side of the first arm so that the first bail supporting member is free to pivot, and which has a line guiding part, (iii) a second bail supporting member which is mounted on the second arm so that the second bail supporting member is free to pivot, and whose center of pivoting motion is located forward of the center of pivoting motion of the first bail supporting member, and (iv) a bail which is installed between the first bail supporting member and second bail supporting member, and which is capable of adopting both a line retrieving position and a line releasing position.

The rotor is caused to rotate by rotating the handle. As a result, the fishing line is wound on the spool while being guided by the bail and the line guiding part installed on the tip of one of the arms of the rotor. Here, the first bail supporting member on which the line guiding part is installed is mounted on the inner-circumferential side of the first arm. The center of pivoting motion of the first bail supporting member is located further to the rear than the center of pivoting motion of the second bail supporting member.

In this case, there is less likelihood that the first bail supporting member will contact the hand holding the fishing rod during the rotation of the rotor. Accordingly, the reel can be positioned closer to the fishing rod. Furthermore, the center of gravity of the second bail supporting member is moved closer to the center of gravity of the first bail supporting member, so that the gap in the axial direction is reduced. As a result, the moment acting on the axis of rotation is reduced, so that there is less vibration during the rotation of the rotor.

According to a preferred embodiment of the present invention, the pivoting axis which connects the centers of pivoting motion of the first and second bail supporting members is offset from the axis of rotation toward the bail in the line releasing position. Accordingly, any imbalance that might be caused by the bail during rotation is reduced.

According to another preferred embodiment of the present invention, the end part, on the reel main body side, of at least the first arm of the first and second arms is offset from the pivoting axis toward the bail in the line retrieving position. Accordingly, there is less likelihood that the first bail supporting member will interfere with the first arm when the bail is pushed over into the line releasing position. Furthermore, any imbalance that might be caused by the bail supporting members or line guiding part, etc., during rotation is reduced.

According to still another preferred embodiment, the second bail supporting member is mounted on the outer-circumferential side of the second arm. Accordingly, any imbalance that might be caused in particular by the line guiding part during rotation is reduced.

In accordance with yet another preferred embodiment, the first and second bail supporting members have a common pivoting axis, and the pivoting planes of the bail supporting members are perpendicular to the pivoting axis. Accordingly, the line guiding part, etc. is positioned further inward when the bail is pushed over into the line releasing position, so that entanglement of the fishing line is less likely to occur. Furthermore, the pivoting of the bail supporting members can be performed smoothly in spite of the fact that the pivoting axis is inclined with respect to the axis of rotation. In addition, the distance between the reel and the fishing rod can be reduced so that the reel as a whole can be made more compact.

In accordance with a further preferred embodiment, covers are mounted on the outer-circumferential sides of at least one of the first arm and second arm. Accordingly, projections, etc., are covered so that entanglement of the fishing line, etc., can be prevented. Furthermore, the arms are protected. As a result, the arms are less likely to be damaged.

The inventive spinning reel preferably also includes a level winding mechanism for uniformly winding a fishing line onto the spool. In a more specific embodiment, the level winding mechanism comprises a spool shaft adapted for reciprocating motion, the spool shaft having a forward end which is fastened to the spool and a rear end. A rotatable screw shaft disposed beneath and parallel to the spool shaft, and having an outer circumferential surface in which a plurality of spiral grooves are defined, is engaged by a slider. The slider is adapted for reciprocating motion along the screw shaft and is affixed to the rear end of the spool shaft. An intermediate gear is affixed to the screw shaft and engages the pinion gear.

Preferably, the slider is mounted within the reel main body parallel to the spool shaft by means of two guide shafts and engages only a portion of the outer circumferential surface of the screw shaft.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Figure 1:
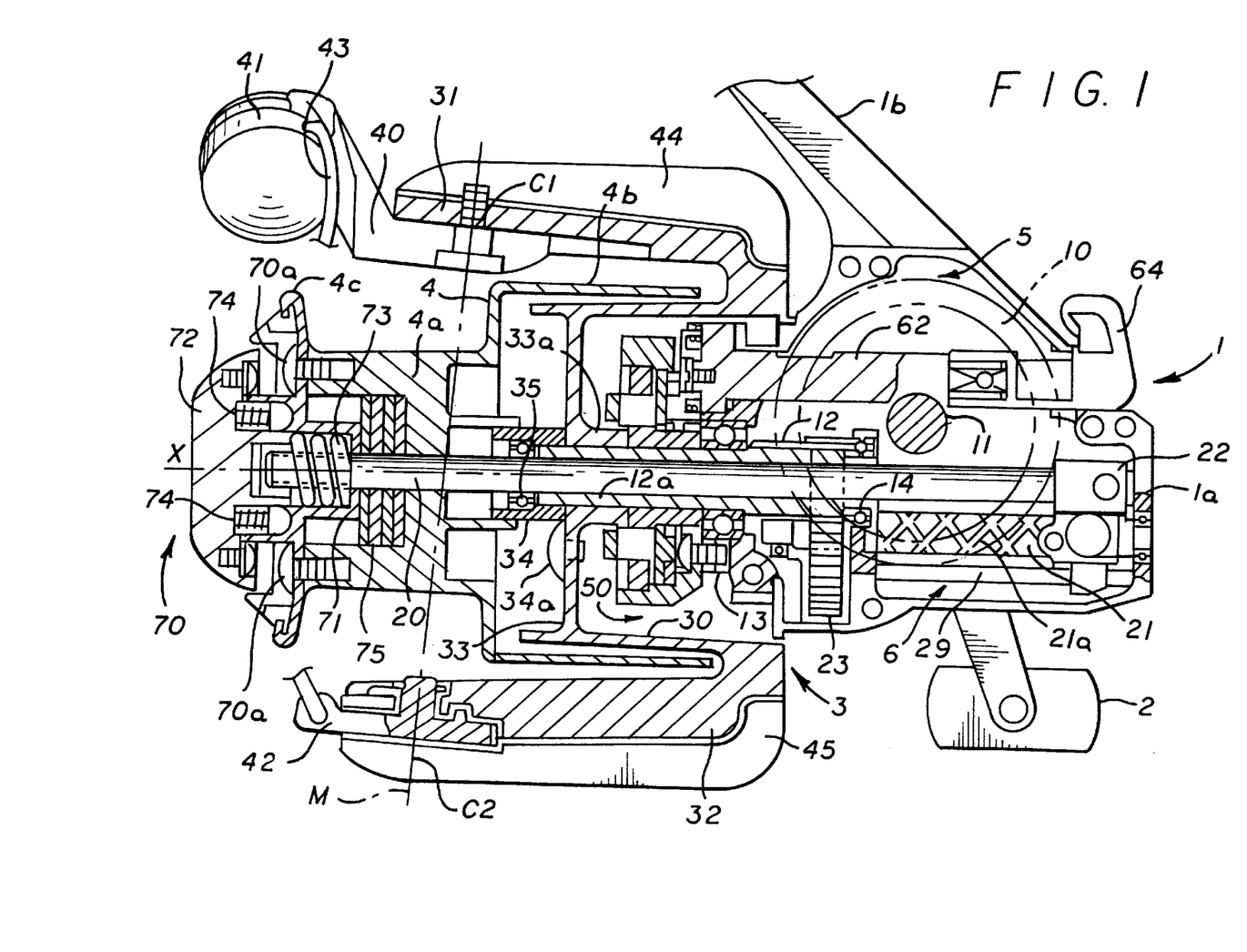
FIG. 1 is a sectional front view of a spinning reel which constitutes one embodiment of the present invention.
Figure 2:
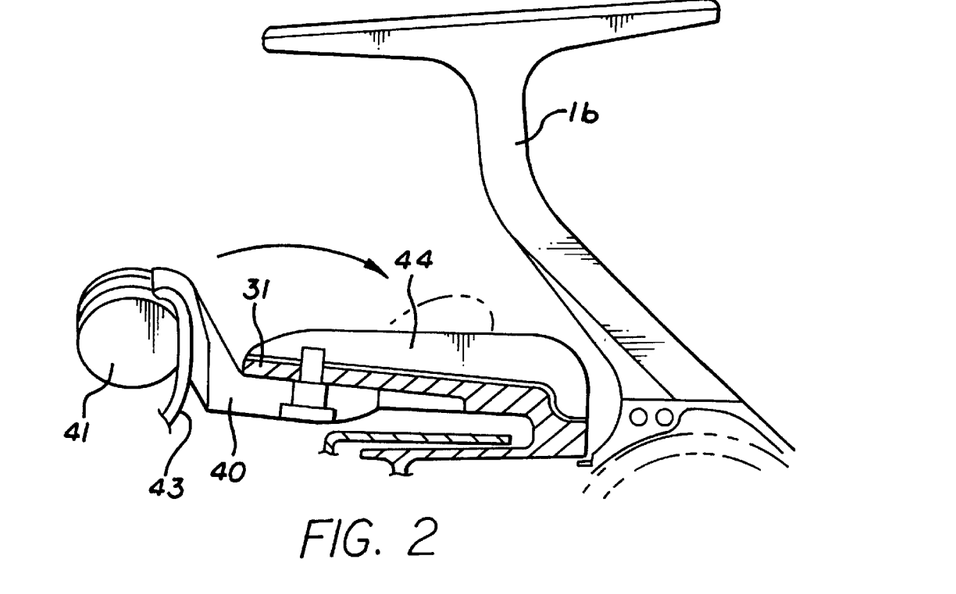
FIG. 2 shows the fishing rod attachment part of the spinning reel.
Figure 3:
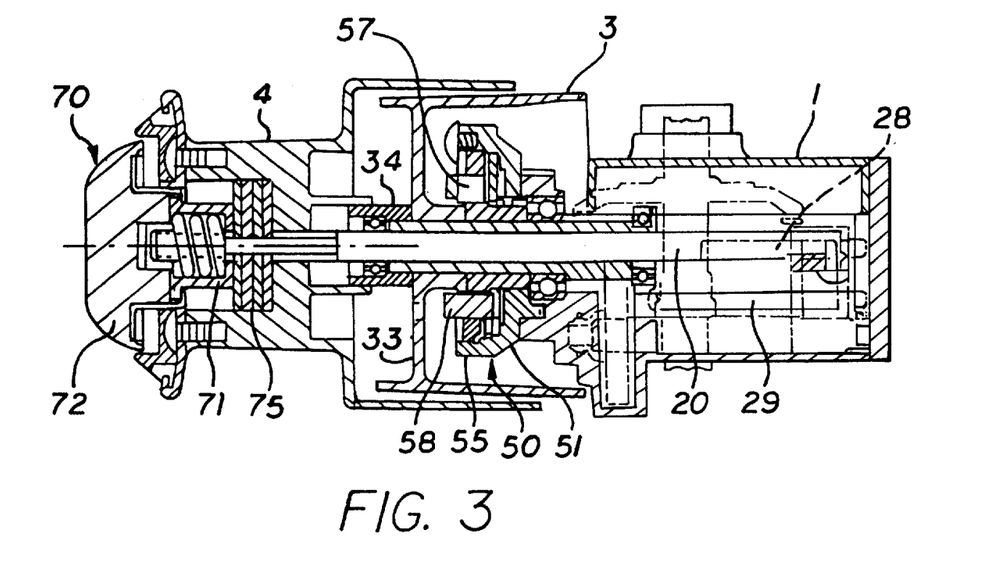
FIG. 3 is a sectional plan view of the spinning reel.

The spinning reel shown in FIGS. 1 through 3, which constitutes one embodiment of the present invention, is equipped with a reel main body 1 which has a handle 2, a rotor 3 which is supported on the front part of reel main body 1 so that rotor 3 is free to rotate, and a spool 4 which is installed on the front part of the rotor 3, and which takes up the fishing line.

The reel main body 1 has a body unit 1a, and an attachment element 1b which is used to attach the spinning reel to the fishing rod is formed on the upper portion of body unit 1a. A rotor driving mechanism 5 which is used to cause rotation of the rotor 3, and a level winding mechanism 6 which is used to take up the fishing line uniformly on the spool 4 by causing the spool 4 to move back and forth along the axis of rotation X, are installed inside the body unit 1a.

The rotor driving mechanism 5 has a face gear 10 which rotates together with a shaft 11 to which the handle 2 is fastened, and a pinion gear 12 which engages with face gear 10. The pinion gear 12 is formed in the shape of a cylinder; the front part of pinion gear 12 passes through the central portion of the rotor 3 and extends toward the spool 4. Furthermore, a screw part is formed on the tip end of pinion gear 12. The intermediate and rear end parts of the pinion gear 12 (in the axial direction) are supported on the reel main body 1 via bearings 13 and 14 so that pinion gear 12 is free to rotate.

The level winding mechanism 6 is a mechanism which is used to move the spool 4 back and forth in the axial direction by moving a spool shaft 20 which is fastened to the central portion of the spool 4 in direction. The level winding mechanism 6 has a screw shaft 21 which is installed beneath the spool shaft 20, a slider 22 which moves back and forth along screw shaft 21, and an intermediate gear 23 which is fastened to the tip end of screw shaft 21. The screw shaft 21 is installed parallel to the spool shaft 20, and is supported on the body unit 1a so that screw shaft 21 is free to rotate. Furthermore, spiral grooves 21a are formed in the outer circumferential surface of the screw shaft 21. The rear end of the spool shaft 20 is fastened to the slider 22. Moreover, the intermediate gear 23 engages with the pinion gear 12.

Figure 4:
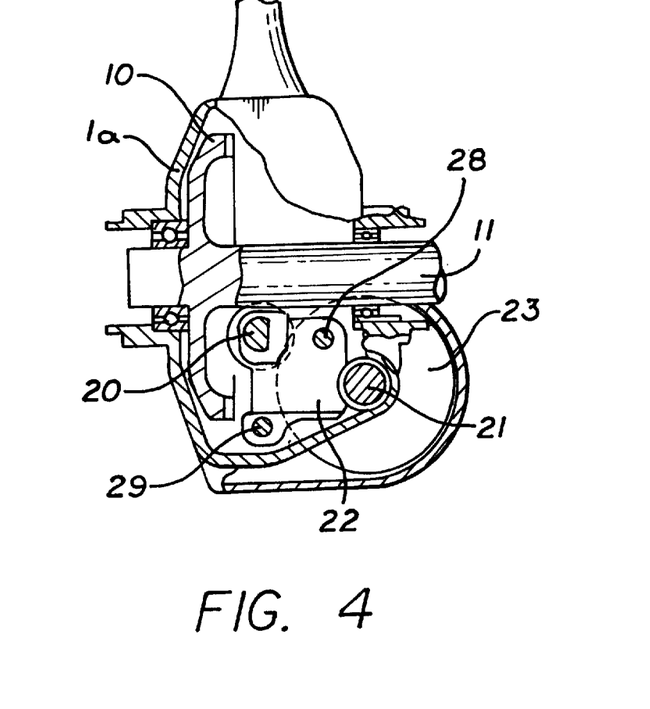
FIG. 4 is a sectional back view of the spinning reel.
Figure 5:
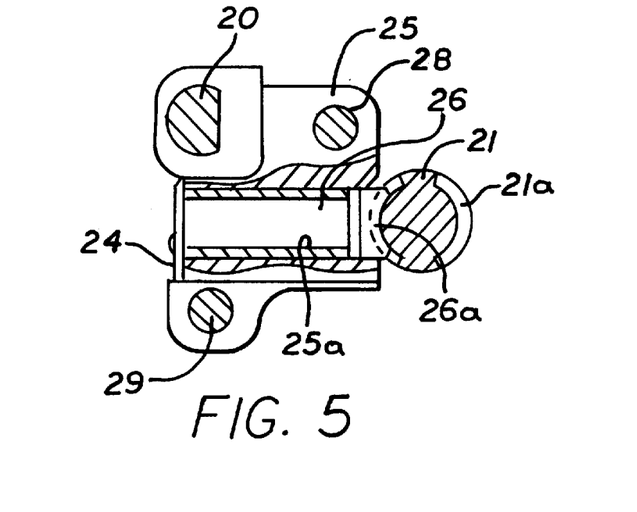
FIG. 5 is a partially sectional structural diagram of the slider.

As is shown in FIGS. 4 and 5, the slider 22 has a slider main body 25 and an engaging member 26 which is accommodated inside slider main body 25.

The slider main body 25 is mounted on two guide shafts 28 and 29 which are installed parallel to the spool shaft 20, so that slider main body 25 is free to slide on guide shafts 28 and 29. Since the slider main body 25 is guided by the two guide shafts 28 and 29, inclination of the slider main body 25 during sliding is prevented. Accordingly, there is no need to form the slider main body 25 so that slider main body 25 covers the entire circumference of screw shaft 21 as in the case of conventional slider main bodies. Hence, the slider main body 25 used in the present embodiment has a shape which is such that slider main body faces only one side surface of the screw shaft 21. Thus, the amount of projection of the slider main body 25 toward the other side surface of the screw shaft 21 is reduced. As a result, the size of the reel main body can be reduced.

Furthermore, a laterally oriented hole 25a is formed in the slider main body so that the hole intersects with the screw shaft 21 at right angles. The engaging member 26 is inserted into this hole 25a so that engaging member 26 is free to slide. An engaging element 26a which engages with the grooves 21a of the screw shaft 21 is formed on the tip end of the engaging member 26. A covering member 24 is fastened to one end of the hole 25a the slider main body 25.

The rotor 3 has a cylindrical element 30, as well as a first arm 31 and second arm 32 which are installed facing each other on the sides of the cylindrical element 30. The cylindrical element 30 and the arms 31 and 32 are formed as an integral unit. In the alternative, the cylindrical element 30 and the arms 31 and 32 can be formed as separate elements. Arms 31 and 32 can then be affixed to cylindrical element 30.

A front wall 33 is formed on the front portion of the cylindrical element 30, and a boss 33a is formed in the central portion of front wall 33. A through-hole is formed in the central portion of boss 33a, and the spool shaft 20 and front part 12a of the pinion gear 12 pass through this through-hole. A nut 34 is installed on the front side of the front wall 33; this nut 34 is screwed onto the tip-end screw part of the pinion gear 12. A bearing 35 which supports the spool shaft 20 so that shaft 20 is free to rotate is installed on the inside circumference of the nut 34.

A first bail supporting member 40 is attached to the inner-circumferential side of the tip of the first arm 31 so that first bail supporting member 40 is free to pivot. A line roller 41 which is used to guide the fishing line onto the spool 4 is mounted on the tip of first bail supporting member 40. Furthermore, a second bail supporting member 42 is mounted on the outer-circumferential side of the tip of the second arm 32. For example, this second bail supporting member 42 can be constructed from a material which has a larger specific gravity than the other parts, and can thus be caused to function as a balancer which eliminates any imbalance that might be caused by the first bail supporting member 40 or line roller 41 during rotation. A bail 43 is installed between the second bail supporting member 42 and the line roller 41 on the tip of the first bail supporting member 40. As a result of the first bail supporting member 40 thus being mounted on the inner-circumferential side of the first arm 31, the radius of rotation of the first bail supporting member 40 is reduced, so that there is less likelihood that bail supporting member 40 will strike the hand holding the fishing rod. Accordingly, the spool and the fishing rod can be positioned closer to each other, so that the overall size of the spinning reel can be reduced. Furthermore, since the radius of rotation is reduced, it is easier to prevent an imbalance from occurring during rotation.

Furthermore, optional covers 44 and 45 are attached to the outer-circumferential sides of the arms 31 and 32. The surfaces of these covers 44 and 45 are formed so that the surfaces are smoothly continuous in the longitudinal direction and in the circumferential direction. As a result, snagging of the fishing line can be prevented.

Here, both bail supporting members 40 and 42 are free to pivot about a single pivoting axis M. If the point where the plane of attachment of the first bail supporting member to the first arm 31 intersects with the pivoting axis M is taken as the center of pivoting motion C1, and the point where the plane of attachment of the second bail supporting member to the second arm 32 intersects with the pivoting axis M is taken as the center of pivoting motion C2, then the center of pivoting motion C2 is positioned further forward than the center of pivoting motion C1. In other words, the pivoting axis M is inclined with respect to the axis of rotation X. Furthermore, the bail supporting members 40 and 42 are installed so that the pivoting planes of members 40 and 42 are perpendicular to the pivoting axis M.

Figure 6:
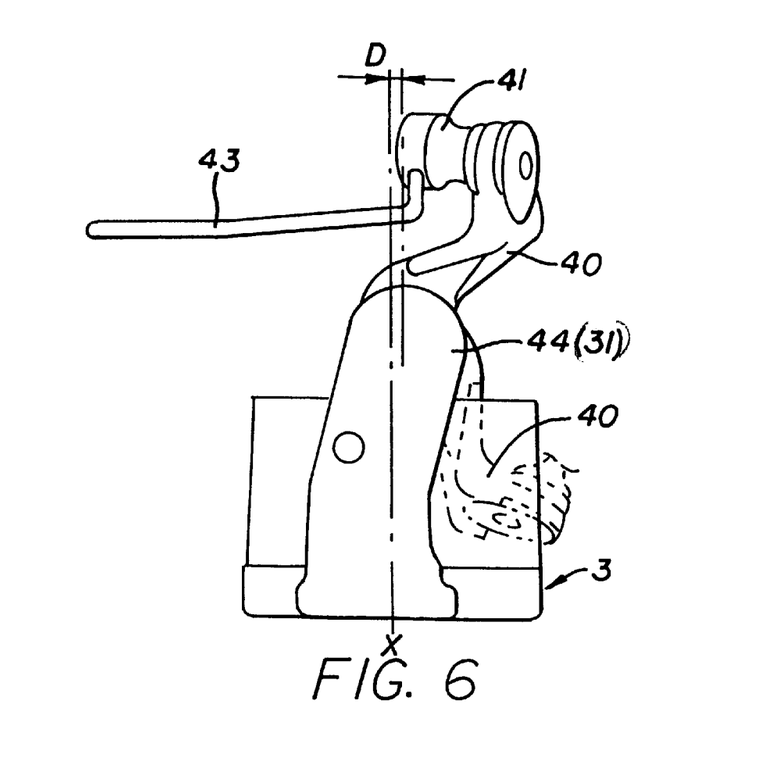
FIG. 6 is a side view of the rotor.
Figure 7:
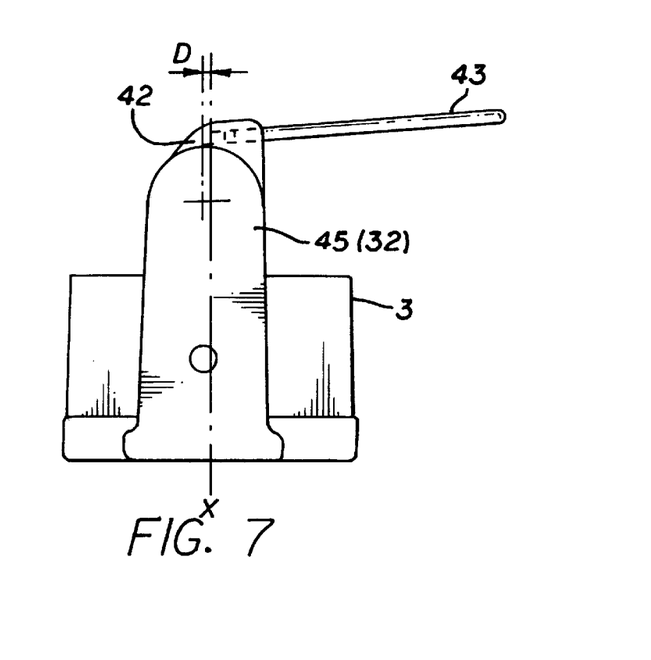
FIG. 7 is a view from the other side of the rotor.

Furthermore, as is shown in FIGS. 6 and 7, the rear portion of the first arm 31 (on the reel main body side) is offset from the axis of rotation X toward the bail in the line retrieving position. Furthermore, from the central portion (with respect to the axial direction) forward, first arm 31 is inclined toward the opposite side (i.e., toward the bail in the line releasing position). As a result of the rear portion of the first arm 31 thus being offset toward the bail in the line retrieving position, interference between the bail 43 and the first arm 31 is reduced when the bail 43, is pushed over into the line releasing position (as indicated by the one-dot chain line in FIG. 6. Furthermore, any imbalance that might be caused by the first bail supporting member 40 or line roller, etc., during rotation can be reduced. Meanwhile, as is shown in FIG. 7, the second arm 32 extends in more or less a straight line overall. Furthermore, the centers of pivoting motion of the first and second bail supporting members 40 and 42 are offset by a distance D from the axis of rotation X toward the bail in the line releasing position. As a result, any imbalance that might be caused by the bail 43 during rotation can be reduced.

Figure 8:
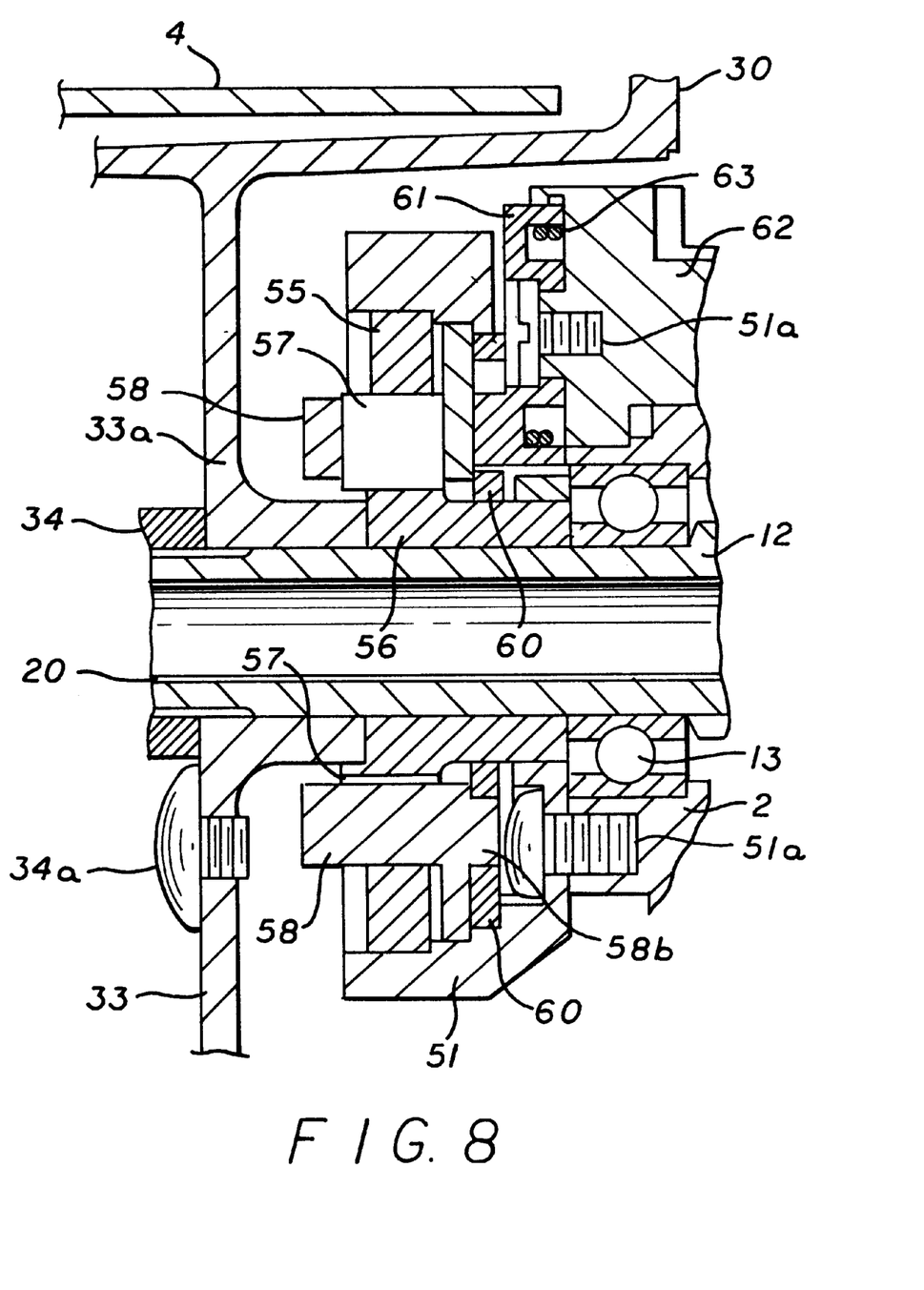
FIG. 8 is a sectional structural diagram of the reverse rotation preventing mechanism.
Figure 9:
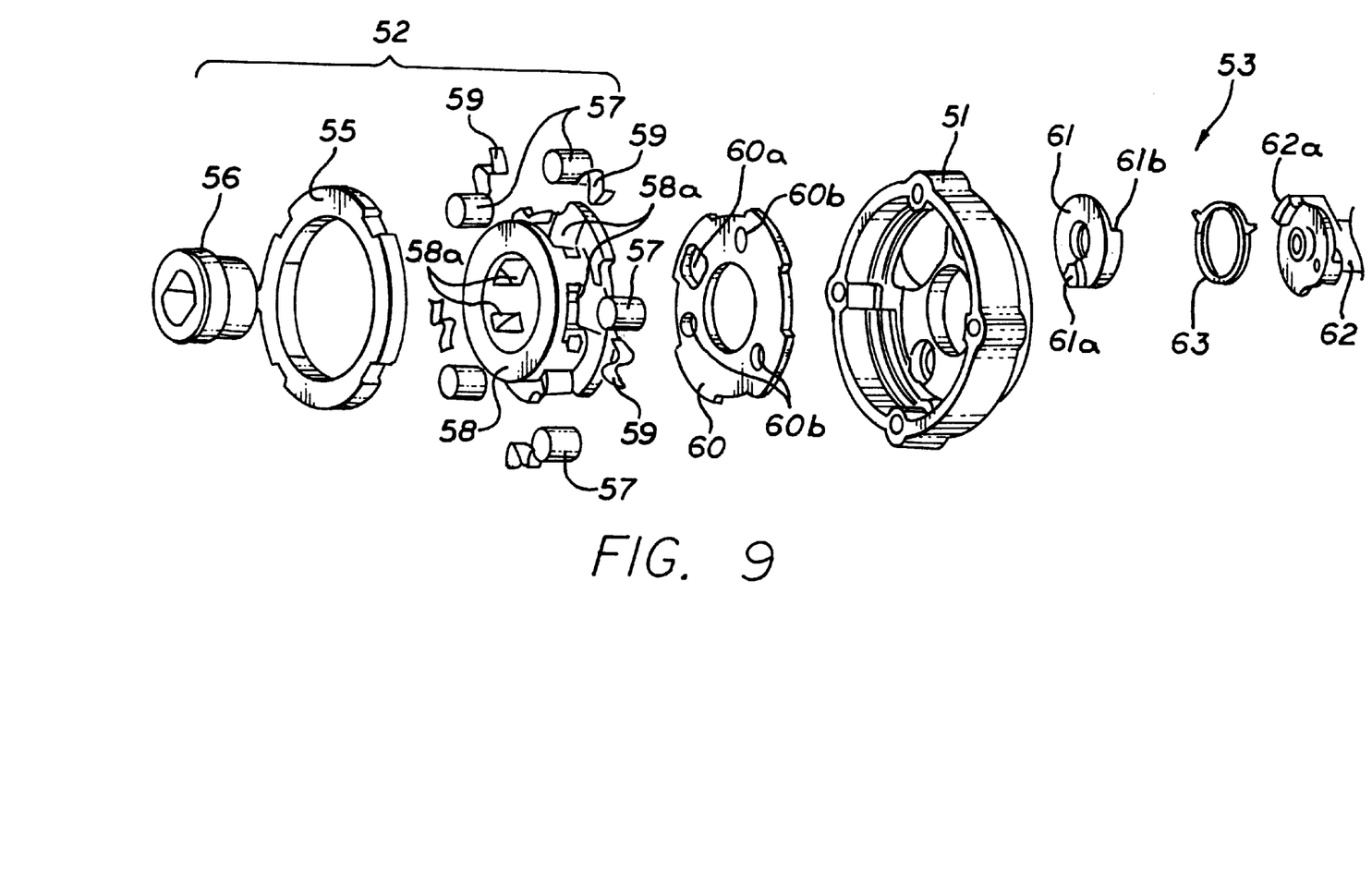
FIG. 9 is an explode perspective view of the reverse rotation preventing mechanism.

A mechanism 50 which prevents reverse rotation of the rotor 3 is installed inside the cylindrical element 30 of the rotor 3. As is shown in FIGS. 8 and 9, this reverse rotation preventing mechanism has a frame 51 which is fastened to the reel main body 1 by fastening means such as screws 51a, a roller type one-way clutch 52 which is accommodated inside frame 51, and an operating mechanism 53 which switches the one-way clutch 52 between an operative state and an inoperative state.

The one-way clutch 52 has an outer ring 55 which is mounted on the frame 51 so that relative rotation between outer ring 55 and frame 51 is impossible, an inner ring 56 which is fastened to the outer circumference of the front cylindrical part of the pinion gear 12, a multiple number of rollers 57, and a retainer 58 which holds the rollers 57. The rollers 57 are positioned between the outer ring 55 and the inner ring 56, and are capable of adopting either an operative position in which the rollers engage the rings, or an inoperative position in which the rollers idle between the rings. The retainer 58 is a more or less cylindrical member which is accommodated inside the frame part 51; this retainer 58 can rotate through a prescribed angular range. Furthermore, a multiple number of accommodating cut-outs 58a are formed in the retainer 58 at equal angular intervals in the circumferential direction. A roller 57 is accommodated inside each of these cut-outs 58a so that roller 57 is free to move in the circumferential direction through a prescribed angular range, i.e., so that roller 57 is free to move between the operative position and the inoperative position. Furthermore, when the clutch is "on" (with the rollers 57) in their operative positions), relative rotation between the outer ring 55 and the inner ring 56 is impossible in one direction only, and when the clutch is "off" (with the rollers 57) in their inoperative positions), the outer ring 55 and inner ring 56 are free to rotate relative to each other. Moreover, a bent plate-form leaf spring 59 which drives the corresponding roller 57 toward the operative position is installed inside each cut-out 58a.

The operating mechanism 53 has a more or less disk-form operating plate 60 which is installed inside the frame part 51, a pivoting member 61, an operating rod 62 which causes pivoting member 61 to pivot, a torsion coil spring 63 (used as a shock-absorbing mechanism) which is installed between the pivoting member 61 and the operating rod 62, and an operating lever 64 which is connected to the rear end of the operating rod 62 (see FIG. 1).

An anchoring hole 60*a* is formed in a portion of the operating plate 60, and an anchoring projection 61*a* formed on the side surface of the pivoting member 61 is anchored in this anchoring hole 60*a*. Furthermore, a multiple number of holes 60*b* are formed in the operating plate 60 at equal angular intervals in the circumferential direction, and projections 58*b* formed on the rear end surface of the retainer 58 are inserted into these holes 60*b*. As a result, when the pivoting member 61 pivots, the retainer 58 is also caused to pivot via the operating plate 60, so that the 60, so that the rollers 57 can be moved between their operating positions and their inoperative positions. An engaging element 61*b* formed on the rear end surface of the pivoting member 61 and an engaging element 62*a* formed on the front end surface of the operating rod 62 are capable of engaging with each other; however, relative rotation of the two parts is possible within a prescribed angular range. One end of the torsion coil spring 63 is fastened to the pivoting member, and the other end of spring 63 is fastened to the front end surface of the operating rod 62. Accordingly, the operating force of the operating rod 62 is transmitted as a rotational moment to the pivoting part 61 via the torsion coil spring 63.

The spool 4 is installed between the first arm 31 and second arm 32 of the rotor 3, and is mounted on the tip of the spool shaft 20 via a drag mechanism 70. The spool 4 has a line-winding drum part 4*a* around whose outer circumference the fishing line is wound, a skirt 4*b* which is formed as an integral unit with the rear portion of the line-winding drum part 4*a*, and a flange plate 4*c* which is fastened to the front end of the line-winding drum part 4*a*. The flange plate 4*c* preferably is formed from a stainless steel plate material, and is mounted on the line-winding drum part 4*a* by means of fasteners such as screws 70*a*. In this case, the flange plate 4*c* is slightly bent, and is attached using the springiness caused by this bending to insure that no gap is formed between flange plate 4*c* and the front end of the line-winding drum part 4*a*. As a result, the fishing line cannot become caught between these parts.

The drag mechanism 70 has a pressing member 71 which is pressed against the inside front end surface of the spool 4, an adjustment knob 72 which is used to adjust the drag force, pushing springs 73 and 74 which are installed between the pressing member 71 and the adjustment knob 72, and a multiple number of clutch plates 75 which are installed between the pressing member 71 and the spool 4. In such a construction, the force with which the pressing member 71 is pressed against the spool 4 can be adjusted by adjusting the amount of tightening of the adjustment knob 72. Accordingly, the drag force is adjustable.

During casting, the bail 43 is pushed over into the line releasing position. As a result, the first and second bail supporting members 40 and 42 rotate in the same direction about the pivoting axis M. In this case, the first bail supporting member 40 is installed on the inner-circumferential side of the first arm 31, and the pivoting axis M is inclined with respect to the axis of rotation X as shown in FIG. 1; accordingly, the first bail supporting member 40 and the line roller 41 on the tip of member 40 move inward from the positions in which the parts are located when the bail 43 is in the line retrieving position. As a result, there is little likelihood that the fishing line will become entangled with the first bail supporting member 40 or line roller 41 when the fishing line is paid out during casting.

Furthermore, although the pivoting axis M is inclined with respect to the axis of rotation X, both bail supporting members 40 and 42 rotate about single pivoting axis M, and the planes of rotation of members 40 and 42 are perpendicular to pivoting axis M. Accordingly, rotation can be performed smoothly without any wrenching movement.

During take-up of the fishing line, the bail 43 is pushed over into the line retrieving position. When the handle 2 is rotated in this state, this rotational force is transmitted to the pinion gear 12 via the handle shaft and face gear 10. The rotational force transmitted to the pinion gear 12 is transmitted to the rotor 3 via the front part 12*a* of the pinion gear 12.

Meanwhile, the screw shaft 21 is caused to rotate by the intermediate gear 23 which engages with the pinion gear 12, so that the slider 22 which engages with the grooves 21*a* formed in the screw shaft 21 moves back and forth while being guided by the guide shafts 28 and 29. As a result, the spool shaft 20 and spool 4 perform a reciprocating motion back and forth along the axis of rotation X, so that the fishing line, which is guided onto the spool 4 by the bail 43 and the line roller 41, is wound uniformly (with respect to the longitudinal direction of the spool 4) around the outer circumference of the drum part 4*a* of the spool 4.

Furthermore, since the slider 22 performs a reciprocating motion while being guided by two guide shafts 28 and 29, the reciprocating motion is performed smoothly without any rotation or inclination of the slider 22. Accordingly, it is not necessary for the slider main body 25 to cover the entire circumference of the screw shaft 21. As a result, the space on the opposite side from the engaging member 26 can be reduced. Consequently, the amount of lateral protrusion of the rear part of the reel main body 1 can be reduced.

During the rotation of the rotor 3, members such as the bail 43, etc., tend to cause a rotational imbalance. In the present embodiment, therefore, the rear end portions of the arms 31 and 32 are offset toward the bail in the line retrieving position, and the pivoting axis of the bail supporting members 40 and 42 is offset toward the bail in the line releasing position, in order to eliminate any imbalance that might be caused by the bail supporting members 40 and 42, line roller 41 or bail 43. Furthermore, any imbalance that might be caused by the line roller 41 is reduced by installing the second bail supporting member 42 further forward than the first bail supporting member 41. Moreover, by constructing the second bail supporting member 42 from a heavy material which has a higher specific gravity than the other parts, it is possible to cause second bail supporting member 42 to function as a balancer.

Figure 10A:
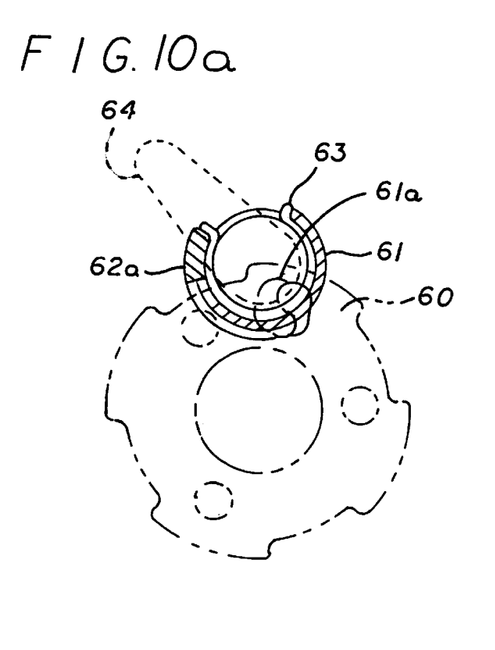
FIGS. 10(a)–(c) are explanatory diagrams which illustrate the operation of the reverse rotation preventing mechanism.

In order to prevent the rotor 3 from rotating in the reverse direction during casting, etc., the rollers 57 are moved into their operative positions by means of the operating lever 64. Specifically, as is shown in FIG. 10*a*, the operating lever 64 is caused to pivot to one side, thus causing the operating rod 62 to pivot in the same direction. This force is transmitted directly to the pivoting member 61 via the engaging element 62*a* of the operating rod 62, and is also transmitted to the retainer 58 via the operating plate 60. As a result, the retainer 58 pivots so that the rollers 57 held in retainer 58 are placed in a state which allows rollers 57 to move into their operative positions. When the rotor 3 rotates in the forward direction (i.e., in the direction of fishing line take-up) in such a state, the rollers 57 idle between the outer ring 55 and the inner ring 56. As a result, the rotation of the rotor 3 in the forward direction is not hindered. On the other hand, if the rotor 3 should rotate in the reverse direction (i.e., in the direction of fishing line pay-out), the rollers 57 will engage the outer ring 55 and inner ring 56 so that relative rotation of the rings becomes impossible. Here, since the outer ring 55 is fastened to the reel main body 1 via the frame part 51, the rotation of the inner ring 56, i.e., the rotation of the rotor 3 in one direction (the direction of fishing line pay-out), is prevented.

Figure 10B:
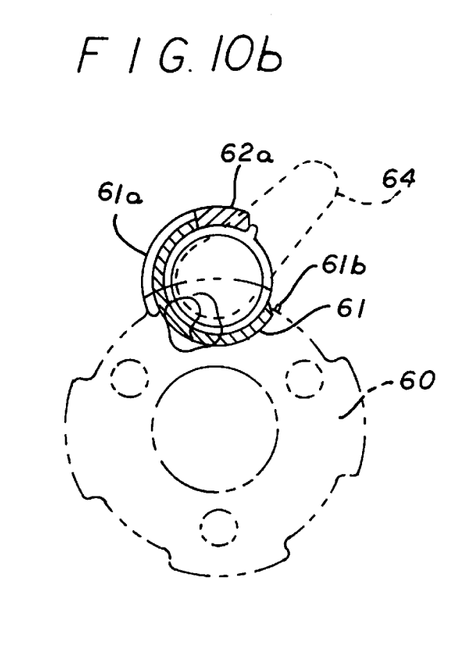

When the operating lever 64 is caused to pivot in the opposite direction from the aforementioned direction (as shown in FIG. 10b), the rollers 57 are caused to move into their inoperative positions by an action similar to that described above. In this state, the rollers 57 cannot engage the outer ring 55 and inner ring 56. Accordingly, the inner ring 56 can rotate in both the forward and reverse directions relative to the outer ring 55, so that the rotor 3 can rotate in the direction of fishing line pay-out.

Figure 10C:
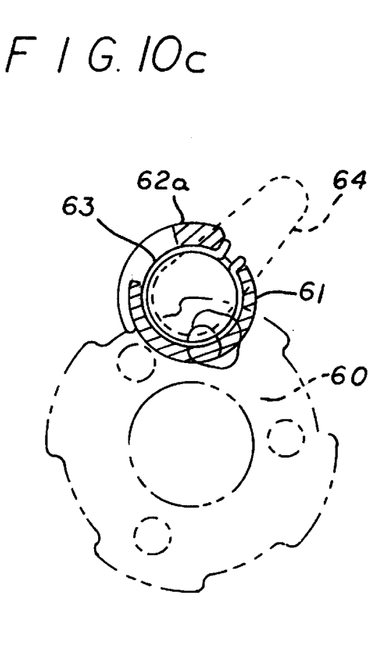

Here, when the rollers 57 engage the rings 55 and 56, a large force is required in order to extract the rollers 57 from between the rings 55 and 56 and move rollers 57 into their inoperative positions. If an attempt is made to move the rollers 57 directly by means of the operating rod 62, etc., in this state, there is a danger that the operating rod 62, etc., will be damaged. Accordingly, in the present embodiment, a torsion coil spring 63 is installed as a shock-absorbing mechanism between the operating rod 62 and the pivoting member 61. In this case, when the operating lever 64 is operated with the rollers 57 engaging in their operative positions so that a load is applied, the rotational force of the operating lever 64 is temporarily stored in the torsion coil spring 63 (this state is illustrated in FIG. 10c). Then, when the load acting on the rollers 57 in their operative positions is released, the rotational force stored in the torsional coil spring 63 is transmitted to the rollers 57 via the pivoting member 61, etc.

Thus, by installing the torsion coil spring 63 as a shock-absorbing mechanism in the operating mechanism 53, it is possible to avoid damage to the operating lever 64 and operating rod 62, etc.

Furthermore, since the retainer 58 is caused to pivot by the pivoting member 61 via the operating plate 60, inclination of the retainer 58 can be reduced compared to cases where the retainer 58 is caused to pivot directly by the pivoting member 61.

In the embodiment described above, second bail supporting member 42 is installed on the outer-circumferential side of second arm 32. According to an alternative embodiment, second bail supporting member 42 can be installed on the inner-circumferential side of second arm 32, just as first bail supporting member 40 is installed on the inner-circumferential side of first arm 31.

In the embodiment described above, torsion coil spring 63 is installed between operating rod 62 and pivoting member 61. Another possible embodiment accomplishes shock absorption by installing some other elastic member, etc.

It would also be possible to omit operating plate 60 installed between pivoting member 61 and retainer 58.

In the embodiment described above, torsion coil spring 63 is installed between operating rod 62 and pivoting member 61 as a shock-absorbing mechanism. According to another embodiment, the rotational force can be transmitted directly between operating rod 62 and pivoting member 61 without installing a shock-absorbing mechanism.

Furthermore, in the embodiment described above, the system is designed so that the shock-absorbing mechanism functions only when the reverse rotation preventing mechanism is released, i.e., switched from an "on" state to an "off" state. According to another embodiment, the system is designed so that the shock-absorbing mechanism functions both when the reverse rotation preventing mechanism is switched from an "on" state to an "off" state, and when the reverse rotation preventing mechanism is switched from an "off" state to an "on" state.

What is claimed is:

1. A spinning reel adapted to be mounted on a fishing rod, said reel comprising
   a reel main body which has a front part and a handle and which is adapted to be mounted on a fishing rod,
   a rotor which has an axis of rotation, which is supported on said front part of said reel main body so that said rotor is free to rotate, and which is caused to rotate by means of said handle, and
   a spool which is installed on the front part of said rotor, and which has an outer circumference adapted to receive a fishing line,
   wherein said rotor comprises
      (i) a first arm and a second arm which are installed facing each other on opposite sides of said axis of rotation of said rotor and have inner- and outer-circumferential sides,
      (ii) a first bail supporting member which is mounted on said inner-circumferential side of said first arm such that said first bail supporting member is free to pivot, and which has a first center of pivoting motion and a line guiding part,
      (iii) a second bail supporting member which is mounted on said second arm such that said second bail supporting member is free to pivot, and which has a second center of pivoting motion which is fronted farther from said front part of said reel main body in the longitudinal direction than said first center of pivoting motion of said first bail supporting member,
   said first and second bail supporting members having a common pivoting axis, and respectively pivoting about said pivoting axis in first and second pivoting planes which are perpendicular to said pivoting axis,
      (iv) a bail which extends between said first bail supporting member and said second bail supporting member, and which is adapted to adopt both a line retrieving position and a line releasing position, and
      (v) first and second covers mounted on said outer-circumferential sides of said first and second arms, respectively, said covers having surfaces that are smoothly continuous in the longitudinal direction and in the circumferential direction.

2. A spinning reel as defined in claim 1, in which a pivoting axis connects said first and second centers of pivoting motion of said first and second bail supporting members, wherein said pivoting axis is offset from said axis of rotation toward said bail in said line releasing position.

3. A spinning reel as defined in claim 1, in which an end of at least said first arm is offset from said pivoting axis toward said bail in said line retrieving position.

4. A spinning reel as defined in claim 1, in which said second bail supporting member is mounted on said outer-circumferential side of said second arm.

5. A spinning reel comprising
   (i) a reel main body having a front part, and
   (ii) a rotor which is rotatably supported on said reel main body, said rotor comprising
      (a) a cylindrical element through which an axis of rotation of said rotor is defined,
      (b) opposed first and second arms which have inner- and outer-circumferential sides, (c) a first bail supporting member which is freely pivotally mounted on said inner-circumferential side of said first arm and which has a first center of pivoting motion and a line guiding part, (d) a second bail supporting member which is freely pivotally mounted on said second arm and which has a second center of pivoting motion located farther from said front part of said reel main body in the longitudinal direction than said first center of pivoting motion of said first bail supporting member, (e) a bail which is disposed between said first bail supporting member and said second bail supporting member, and which is adapted to adopt both a line retrieving position and a line releasing position, and (f) first and second covers mounted on said outer-circumferential sides of said first and second arms, respectively, said covers having surfaces that are smoothly continuous in the longitudinal direction and in the circumferential direction, wherein a pivoting axis connects said first and second centers of pivoting motion of said first and second bail supporting members, said pivoting axis being offset from the said axis of rotation toward said bail in said line releasing position, and wherein said first and second bail supporting members respectively pivot about said pivoting axis in first and second pivoting planes which are perpendicular to said pivoting axis.

6. A spinning reel as defined in claim 5, in which said second bail supporting member is mounted on said outer-circumferential side of said second arm.

7. A spinning reel as defined in claim 5, in which said second bail supporting member is mounted on said inner-circumferential side of said second arm.

8. A spinning reel as defined in claim 5 wherein said first arm is inclined outward with respect to said axis of rotation, said inner- and outer-circumferential sides of said first arm are substantially parallel at said first center of pivoting motion, said first pivoting plane is parallel to said inner-circumferential side of said first arm, and said second pivoting plane is inclined with respect to at least one of said inner- and outer-circumferential sides of said second arm.

9. A spinning reel as defined in claim 5 wherein said outer surfaces of said covers extend in the longitudinal direction parallel to said axis of rotation.

10. A spinning reel as defined in claim 5 wherein said first and second covers cover substantially the entire outer-circumferential surfaces of said first and second arms, respectively.

11. A spinning reel as defined in claim 5, wherein said first arm comprises rear and forward portions, said rear portion being offset toward said bail in said line retrieving position, said forward portion being offset toward said bail line said line releasing position.

12. A spinning reel comprising (i) a reel main body, and (ii) a rotor which is rotatably supported on said reel main body, said rotor comprising (a) a cylindrical element through which an axis of rotation of said rotor is defined, (b) opposed first and second arms which have inner- and outer-circumferential sides, said first arm being inclined outward with respect to said axis of rotation, (c) a first bail supporting member which is freely pivotally mounted on said inner-circumferential side of said first arm and which has a first center of pivoting motion and a line guiding part, (d) a second bail supporting member which is freely pivotally mounted on said second arm and which has a second center of pivoting motion, wherein a pivoting axis connects said first and second centers of pivoting motion, said pivoting axis being inclined with respect to said axis of rotation, and wherein said first and second bail supporting members respectively pivot about said pivoting axis in first and second pivoting planes which are perpendicular to said pivoting axis, and (e) a bail which is disposed between said first bail supporting member and said second bail supporting member, and which is adapted to adopt both a line retrieving position and a line releasing position, wherein said inner- and outer-circumferential sides of said first arm are substantially parallel at said first center of pivoting motion, said first pivoting plane is parallel to said inner-circumferential side of said first arm at said first center of pivoting motion, and said second pivoting plane is inclined with respect to at least one of said inner- and outer-circumferential sides of said second arm.

13. A spinning reel as defined in claim 12 wherein said rotor further comprises first and second covers mounted on said outer-circumferential sides of said first and second arms, respectively, said covers having surfaces that are smoothly continuous in the longitudinal direction and in the circumferential direction.

14. A spinning reel as defined in claim 13 wherein said outer surfaces of said covers extend in the longitudinal direction parallel to said axis of rotation.

15. A spinning reel as defined in claim 14 wherein said first and second covers cover substantially the entire outer-circumferential surfaces of said first and second arms, respectively.

16. A spinning reel as defined in claim 12 wherein said first arm comprises rear and forward portions, said rear portion being offset toward said bail in said line retrieving position, said forward portion being offset toward said bail line said line releasing position.

\* \* \* \* \*